June 25, 1968 G. P. WECKLER 3,390,273

ELECTRONIC SHUTTER WITH GATING AND STORAGE FEATURES

Filed Aug. 8, 1966 4 Sheets-Sheet 1

INVENTOR.
GENE P. WECKLER

BY Roger L Borsay
Norman M Kunitz
ATTORNEYS

INVENTOR.
GENE P. WECKLER
BY Roger A. Bowry
Norman M. Kanitz
ATTORNEYS

INVENTOR.
GENE P. WECKLER
BY Roger A Bowey
Norman M Kurtz
ATTORNEYS

INVENTOR.
GENE P. WECKLER
BY Roger S. Borovoy
Norman M. Shenitz
ATTORNEYS 3,390,273

ELECTRONIC SHUTTER WITH GATING AND STORAGE FEATURES

Gene P. Weckler, Campbell, Calif., assignor to Fairchild Camera and Instrument Corporation, Syosset, N.Y., a corporation of Delaware
Filed Aug. 8, 1966, Ser. No. 571,091
18 Claims. (Cl. 250—214)

This invention relates to a storage mode photodetector with electronic shutter action. Shutter action normally refers to a means by which a movable plate attached to a camera is used to control the time period that a light-sensitive material within the camera is exposed to light. When the exposure period has terminated, the plate acts to prevent any further light from reaching the sensitive material. In addition, cameras in many transmission systems employ photosensors that can generate an electronic signal representing the light image to which the camera is exposed. Electronic shutter action in this invention relates to a means for using electrical signals, or pulses, to control electronically the time period that the invented photodetector generates an electrical signal representing the radiant energy to which the photodetector is exposed.

Optical image sensors that can generate an electronic signal representing a light image are needed for a wide range of applications, particularly in television transmission systems. Ideally, the sensor should operate with high-speed shutter action, it should be able to change the time of exposure upon command, and it should allow the electronic signal representing the light image to be read at slower speeds than those at which the shutter operates. Use of a slower read (or scan) rate reduces the rate of information transmission, which in return reduces the required bandwidth for a picture of a given resolution. A narrower bandwidth is important in many applications because it improves the system signal-to-noise ratio and reduces transmission equipment requirements.

Among the different photosensors commonly used, one type operates with a mechanical shutter action. In general, mechanical shutters are slow, are subject to vibration, have greater chance of failing due to jamming or wear from friction, and require the overall camera to be relatively large and heavy. Other photosensors use an electro-optical type of shutter action, the two principal kinds being the image converter and the Kerr cell. Electro-optical shutters can operate at extremely high speeds, but have a number of shortcomings for many applications. For example, to operate properly, they require a high voltage (in the kilovolt range), and usually need esoteric power supplies, specially designed. In addition, they are sensitive to vibration.

Some of the most promising photosensors in recent years have incorporated phototransistors and photodiodes. These solid-state devices have excellent characteristics for use in high-speed image sensing applications. They can operate in the rugged environments of outer space, have high reliability, are light in weight, have high sensitivity, and operate with low power dissipation. Use of phototransistors and photodiodes has been limited, however, because the only satisfactory way of controlling the exposure time of the photosensor has been by mechanical or electro-optical means, which is too slow, requires too heavy or too bulky a camera, or needs too high a voltage. (The exposure time is the interval during which the optically generated signal is recorded.)

Recently, an improved solid-state photosensor has been made available, consisting of a semiconductor device operating in the storage mode and responsive to impinging radiant energy. The operation of a storage mode phototransistor is described in patent application Ser. No. 529,358, filed Feb. 23, 1966, and assigned to the same assignee as this invention. These devices are especially useful when formed in an integrated circuit structure and in large arrays. However, prior to this invention, the read time of the semiconductor photosensor could not be satisfactorily separated from the exposure time. To control exposure time in these devices, information had to be read out at a rate proportional to the shutter speed. A wide dynamic range in the semiconductor photosensor could only be obtained by changing the time of readout to correspond with the change in light intensity. As the light image became more intense, the exposure time needed was shorter, the shutter speed was faster, and the readout time was shorter. With a low light intensity, on the other hand, the exposure time would be longer, the shutter speed slower, and the read time also slower. Because the exposure time could not be separated from and controlled independently of the readout time, the readout time of the semiconductor photosensor had to be changed from fast to slow and vice versa, depending on the change in light intensity, which of course determines the exposure time.

This invention is a significant improvement over prior techniques because it separately controls the exposure time and the readout time in a semiconductor photosensor, thus allowing the two functions to operate independently of each other. Moreover, the photodetector of this invention combines the inherent advantages of solid state devices with the flexibility of being able to store the electrical signal representing the light image for a length of time before it is read out. By storing the electrical signal, the invented photodetector enables the readout or frame time to be controlled independently of the exposure time.

Briefly, the storage mode photodetector with electronic shutter action of this invention comprises a photosensor means having at least one P-N junction therein for producing an electronic signal representing impinging radiant energy thereupon, a storage means having at least one P-N junction therein for storing the electronic signal, a coupling means between the photosensor and storage means for transferring the electronic signal from the photosensor to the storing means at selected intervals, and a means for reading the electronic signal in the storing means at selected intervals.

The invention may be understood better from the following description and the accompanying drawings in which.

Figure 1:
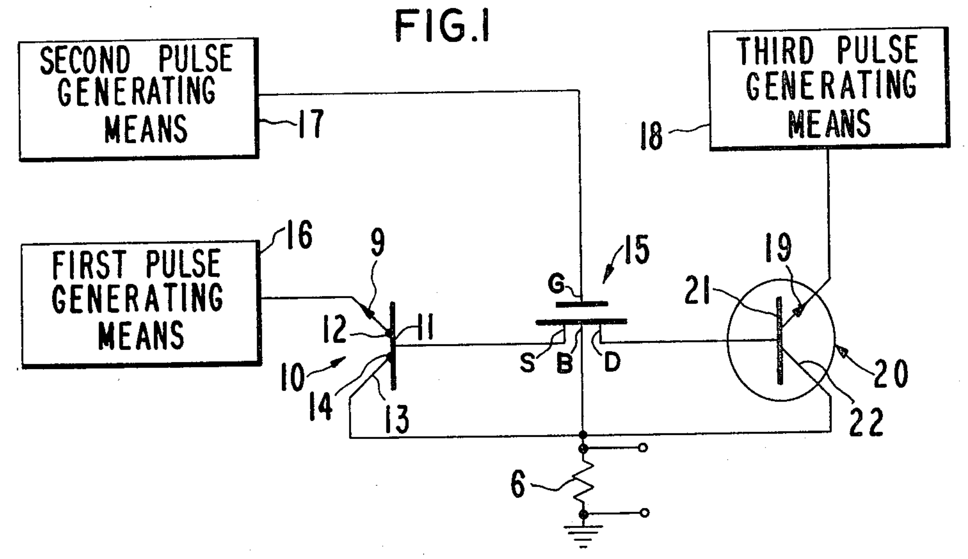
FIG. 1 is a schematic and block circuit diagram of the preferred embodiment of the invented photodetector using transistors operating in the storage mode.

Referring to FIG. 1, the preferred embodiment of the invented photodetector with electronic shutter action using transistors operating in the storage mode is shown. The photosensor means comprises a transistor 10 (hereafter referred to as the phototransistor), which functions to produce an electronic signal representing impinging radiant energy thereupon. A first pulse generating means 16 is coupled to the phototransistor 10, and functions to render the phototransistor operative at selected intervals. The storage means comprises a transistor 20 (hereafter referred to as the storage transistor), which functions to store electronic signal produced by the phototransistor 10 for later readout at selected intervals. A coupling means between phototransistor 10 and storage transistor 20 comprises a gating element (shown as MOS transistor 15), which functions to connect the base of the phototransistor 10 to the base of the storage transistor 20 at selective intervals so that the electronic signal produced by the phototransistor 10 can be transferred to the storage transistor 20 and stored for readout at a later time. A second pulse generating means 17 is connected to the MOS transistor 15 for rendering it operative at selected intervals. A third pulse generating means 18 is connected to the storage transistor 20 and functions to enable information stored in storage transistor 20 to be read out. Also coupled to storage transistor 20 is load resistor 6, across which the output signal appears during readout. Both the phototransistor 10 and the storage transistor 20 are shown as NPN transistors, and the MOS transistor as a p-channel type; however, PNP transistors would operate as well, provided the necessary polarity changes are made in the first pulse generating means 16, the third pulse generating means 18, and the MOS transistor changed to an n-channel type.

The photo transistor 10 has an emitter 9 and a base 11, forming a first junction 12 (emitter-base junction), and a collector 13, which with the base 11 forms a second junction 14 (collector-base junction). The phototransistor 10 and the storage transistor 20 are capable of operating in the storage mode. It should be noted also at this point that, although the gating element is shown as a MOS transistor 15, other types of gating elements may be used, provided the operating characteristics (such as fast switching time and high impedance in the off state) are similar to those of the MOS transistor. The MOS transistor 15 has a gate electrode designated by a G, a source electrode designated by an S, a drain electrode designated by a D, and a bulk electrode designated by a B. The MOS transistor 15 shown in FIG. 1 is a p-channel element of the normally off type; that is, it operates in the enhancement mode. However, it is understood that the MOS transistor 15 may be of the normally on or depletion mode type if desired.

Figure 2:
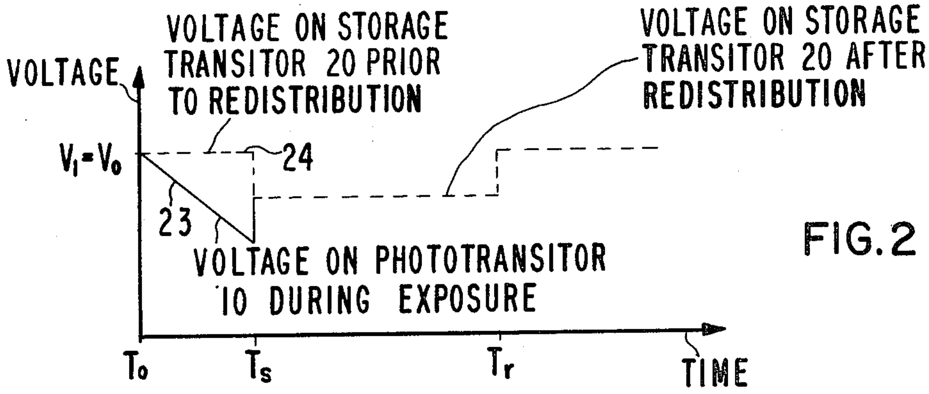
FIG. 2 is a timing diagram for the embodiment of FIG. 1 showing the voltages on the transistors versus time.

Operation of the invented photodetector with electronic shutter action using transistors operating in the storage mode will now be considered with reference to FIGS. 1 and 2. In FIG. 2, the voltage on the phototransistor 10 is shown by a solid line 23 while the voltage on the storage transistor 20 is indicated by a dashed line 24. The phototransistor is a photosensitive element. A dark oval is drawn around the storage transistor 20 to indicate that its sensitive area is protected from exposure to light; hence it is always in the dark and will not be affected by any variation in the external light intensity. A number of different methods may be employed to protect the sensitive area of storage transistor 20 from exposure to light. For example, the transistor may be placed in an opaque enclosure. Another method is to cover its sensitive area with an opaque material.

Before operation begins, third pulse generating means 18 is used to charge the base-collector junction of the storage transistor 20 to a negative voltage $V_0$. Operation is initiated at time $T_0$ by applying a negative voltage of amplitude $V_1$ from the first pulse generating means 16 to the emitter 9 of the phototransistor 10, which places an initial charge on the base-collector junction 14. Once the junction is charged, voltage $V_1$ is removed. The phototransistor 10 is now in the storage mode. Upon exposure to impinging radiant energy in the form of light, the phototransistor 10 begins producing photogenerated current, which removes the charge stored in its base-collector junction 14. At a time $T_s$ after removal of the negative voltage $V_1$ from the phototransistor 10, a negative voltage from the second pulse generating means 17 is applied to the gate electrode G of the MOS transistor 15 to render it operative. That is, a conductive path is formed between the drain D and source S electrodes of MOS transistor 15, thereby connecting the base 11 of the phototransistor and the base 21 of the storage transistor. As previously mentioned, the storage transistor 20 is charged to a voltage $V_0$. Because only generation recombination (or leakage) current is acting to remove the charge stored on the storage transistor 20, the value of the charge still is very nearly the initial value. Connecting the base 11 of the phototransistor to the base 21 of the storage transistor causes a redistribution of the amount of charge on the phototransistor 10, a charge that is proportional to the incident radiant energy during the exposure time $(T_S - T_0)$. Information in the form of an electrical charge is now redistributed between the base-collector P-N junction of phototransistor 10 and to the base-collector P-N junction of the storage transistor 20 (see FIG. 2). After redistribution of the charge, the voltage from the second pulse generating means 17 is removed from the MOS transistor 15, which renders it inoperative (no conductive path between source S and drain D) and isolates the base 21 of the storage transistor from the base 11 of the phototransistor. Thus, by applying negative pulse to and then removing it from the MOS transistor 15, one may control the exposure time of the photodetector. As indicated above, the storage transistor 20 has been protected from exposure to light; after its base is isolated from the phototransistor 10, it is insensitive to any further variations in the impinging radiant energy. At a later time, information stored in the base-collector junction of the storage transistor 20 is read out by applying a negative voltage $V_0$ from the third pulse generating means 18 to the emitter 19 of the storage transistor and measuring the quantity of charge appearing across load resistance 6, which is the amount required to reestablish the initial condition.

Figure 3:
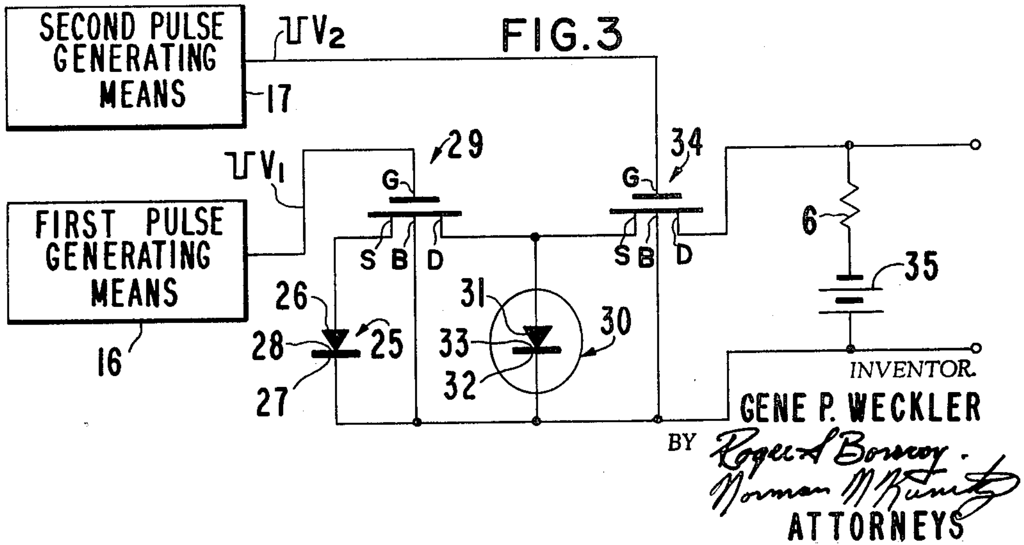
FIG. 3 is a schematic and block circuit diagram of another embodiment of the invented photodetector using diodes operating in the storage mode.

The storage mode photodetector of this invention may incorporate other types of photosensitive semiconductor devices, in addition to transistors operating in the storage mode. For example, referring to FIG. 3, the invented photodetector with electronic shutter action uses semiconductor diodes operating in the storage mode. In FIG. 3 and in all succeeding figures, structures which are the same as those in FIG. 1 have the same reference numeral. The photosensor means comprises a first diode 25 (hereafter referred to as the photodiode). The storage means comprises a second diode 30 (hereafter referred to as the storage diode) and, as with the storage transistor of FIG. 1, is protected from exposure to light. Coupled between the photodiode 25 and storage diode 30 is a gating element, shown in FIG. 3 as a first MOS transistor 29, which functions to place a charge on the photodiode 25 prior to exposure, and to control the exposure time by transferring the electronic signal produced by the photodiode to the storage diode 30 upon command. A first pulse generating means 16 is connected to the first MOS transistor 29 for rendering it operative at selective intervals. Also connected to the storage diode is a second gating element, shown in FIG. 3 as a second MOS transistor 34, a load resistance 6, and a voltage source 35. The second MOS transistor 34 functions to enable a charge to be placed on the anode-cathode junction of the photodiode and the storage diode prior to exposure and after exposure, to enable the electronic signal stored in the anode-cathode junction of diode 30 to be read out. A second pulse generating means 17 is coupled to the second MOS transistor 34 for rendering it operative at selective intervals.

Figure 4:
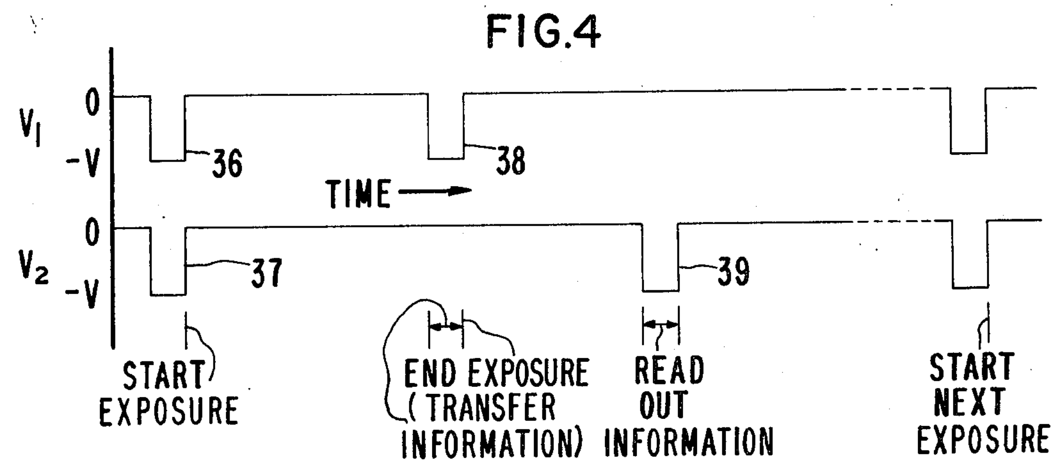
FIG. 4 is a timing diagram showing the photodetector operation for the embodiment of FIG. 3.

The photodiode 25 and storage diode 30 have respective anodes 26 and 31 and respective cathodes 27 and 32, forming respective P-N junctions 28 and 33, and are capable of operating in the storage mode. Operation of the storage mode photodetector with electronic shutter action using photodiodes will now be considered with reference to FIGS. 3 and 4. The photodiode 25 is a photosensitive element. A dark oval is drawn around the storage diode 30 to indicate that its radiant energy sensitive area is protected from exposure to light; hence it is always in the dark and will not be affected by any variation in the impinging radiant energy. Operation is initiated when a negative voltage 36 from the first pulse generating means 16 is applied to the gate electrode of the first MOS transistor 29 and another negative voltage 37 from the second pulse generating means 17 is applied to the gate electrode of the second MOS transistor 34, so that both MOS transistors are rendered operative at the same time, forming a connection between the anode 26 of the photodiode and the anode 31 of the storage diode, and also between the anode 31 of the storage diode and the voltage source 35. With the connection thus formed, the voltage source 35 places an initial negative charge on the respective anode-cathode junctions 28 and 33 of the photodiode 25 and storage diode 30. Once the junctions 28 and 33 are charged, the negative voltages 36 and 37 are removed from the respective gate electrodes G of the two MOS transistors 29 and 34 which renders them inoperative and leaves the photodiode 25 and the storage diode 30 in the storage mode. Upon exposure to light, the photodiode 25 begins producing photogenerated current, which removes the charge from its junction 28. After a selected period from the time the two P-N junctions 28 and 32 were initially charged, a negative voltage 38 from the first pulse generating means 16 is applied to the gate electrode G of the first MOS transistor 29 to again form a conductive path between the respective anodes 26 and 31 of the photodiode 25 and storage diode 30. This causes the amount of charge remaining on the photodiode 25, which is proportional to the impinging radiant energy during the exposure time, and the charge on storage diode 30 to be redistributed between the anode-cathode junctions of the photodiode and the storage diode. After redistribution, the voltage from the first pulse generating means 16 is removed from the first MOS transistor 29, which isolates the anode 31 of the storage diode from the anode 26 of the photodiode. Information is stored on the diode 30 until a later time when it is desired to read the information. A negative voltage 39 from the second pulse generating means 17 is then applied to the gate electrode G of the second MOS transistor 34, so that a conductive path is formed between the anode 31 of the storage diode and the voltage source 35. The amount of charge necessary to reestablish the storage diode 30 to its initial condition is measured, and this amount represents the intensity of the light to which the photodiode 25 was exposed.

The photodetector circuits described can be constructed with a minimum of complexity and in a manner consistent with present processing technology. The device may be fabricated in the form of an integrated circuit and in the form of complex integrated arrays. A description of these forms follows.

Figure 5:
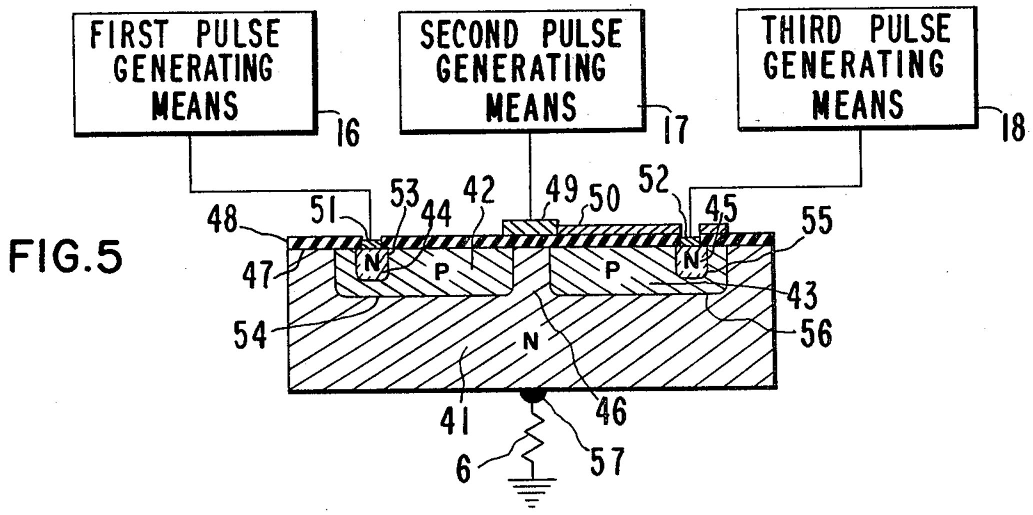
FIG. 5 is a cross-sectional view of an integrated circuit structure of the preferred embodiment of FIG. 1.

Referring to FIG. 5, the structure shown therein is the storage mode photodetector of this invention using transistors operating in the storage mode and is in part similar to well-known double-diffused silicon planar integrated circuits, such as shown in U.S. Patent No. 2,981,877, issued to Dr. Robert N. Noyce and assigned to the same assignee as this invention, and in part similar to well-known insulated-gate, field-effect transistors of the enhancement mode type, such as shown in U.S. Patent No. 3,102,230. Briefly, the structure includes a semiconductor body or substrate 41, a first region 42, a second region 43, separated regions 44 and 45, P-N junctions 53, 54, 55, and 56, an insulating dielectric layer 48, an opaque material 50 (which is a novel application of this invention), and a means for making ohmic electrical contact to the separated regions 44 and 45 comprising two contacts 51 and 52. The body or substrate 41, the first and second regions 42 and 43, and the separated regions 44 and 45 are formed from a monocrystalline semiconductor material, preferably silicon, with the substrate 41 and the separated regions 44 and 45 having a first conductivity type, preferably n-type, and the first and second regions 42 and 43 of an opposite conductivity type, preferably p-type. The substrate 41, the first and second regions 42 and 43, and the separated regions 44 and 45 serve to perform several different functions. One function is that of a phototransistor in which the substrate 41 is the collector, the first region 42 is the base, the separated region 44 is the emitter, the junction 54 is the collector-base junction and the junction 53 is the emitter-base junction. A second function is that of a storage transistor in which the substrate 41 is the collector, the second region 43 is the base, the separated region 45 is the emitter, the junction 56 is the collector-base junction, and the junction 55 is the emitter-base junction. A third function is that of a p-channel enhancement mode MOS transistor in which the first and second regions 42 and 43 are spaced apart and define the ends of a channel region 46. The first region 42 is referred to as the source region while the second region 43 is referred to as the drain region. It is understood that the device may be made symmetrical, such that the first region 42 may function as the drain region while the second region 43 may function as the source region.

An insulating dielectric layer 48, such as a layer of a silicon oxide, is formed over the surface 47 including the channel region 46, the first and second regions 42 and 43, and the separated regions 44 and 45, with a portion of the surface of the separated regions 44 and 45 exposed.

A control gate 49 for applying an electric field to the portion of the insulating layer 48 overlying the channel region 46 is formed over the insulating layer 48. The control gate 49 is positioned over the channel region 46, overlapping somewhat but insulated from the first and second regions 42 and 43, and covering the entire channel region 46 that extends from the first region 42 to the second region 43. The control gate 49 is made from a deposited conductive metal, such as aluminum.

A layer 50 of an opaque material is formed on the exposed surface of the insulating layer 48 overlying the second region 43 so that the sensitive region of the transistor formed by the regions 41, 43, and 45 is protected from exposure to light and information in the form of an electrical charge may be stored safely for later readout. The opaque material may be either nonmetallic (such as a photographic emulsion) or metallic (such as aluminum). Of course, if a metallic material is used, some means must be employed to insulate the metallic material from adjacent metal contacts.

Metalized ohmic electrical contacts, such as the aluminum contacts 51 and 52, are made to the exposed portions of the separated regions 44 and 45. The substrate 41 is also provided with a metalized contact 57 for connection to the load resistor 6. Such metalized contacts as well as the control gate 49 may be formed by techniques such as disclosed in U.S. Patent No. 2,981,877 mentioned above.

Figure 6:
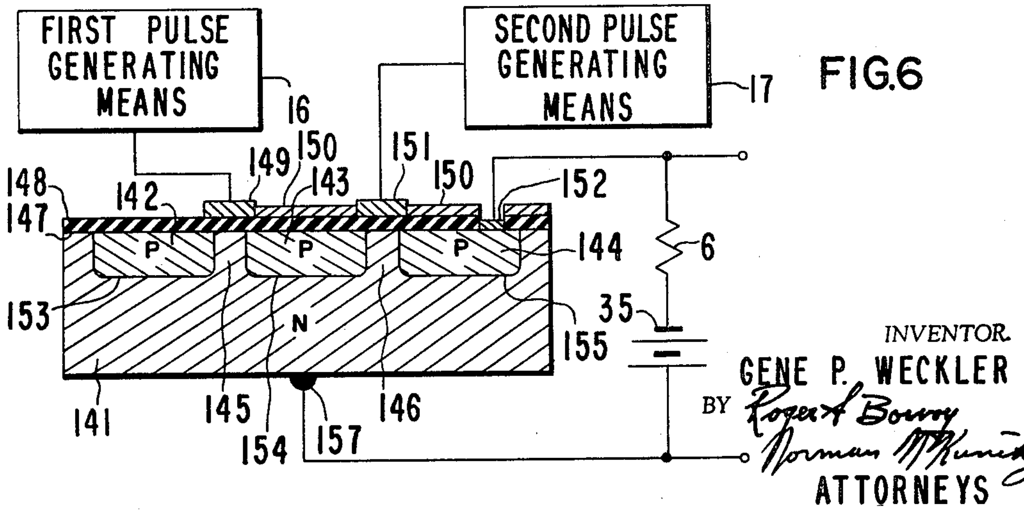
FIG. 6 is a cross-sectional view of an integrated circuit structure of the preferred embodiment of FIG. 3.

An integrated structure for the storage mode photodetector of this invention using diodes operating in the storage mode also can be fabricated easily. For example, in reference to FIG. 6, the structure shown for diodes in many respects is similar to the structure using transistors shown in FIG. 5. Briefly, the diode structure of FIG. 6 includes a semiconductor body or substrate 141, a first region 142, a second region 143, a third region 144, a first junction 153, a second junction 154, a third junction 155, an insulating dielectric layer 148, an opaque material 150, and a means for making ohmic electrical contact to the third region 144 comprising a contact 152. The body or substrate 141 and the first, second, and third regions 142, 143, and 144 are formed from a monocrystalline semiconductor material, preferably silicon, with the substrate 141 of a first conductivity type, preferably n-type, and the first, second and third regions 142, 143, and 144 of an opposite conductivity type, preferably p-type. The substrate 141 forms the cathode and the first region 142 forms the anode of the photodiode. The substrate 141 also forms the cathode and the second region 143 forms the anode of the storage diode. A p-channel, enhancement mode MOS transistor is formed by first and second regions 142 and 143, which are spaced apart and define the ends of a channel region 145. The first region 142 is referred to as the source region while the second region 143 is referred to as the drain region. Another p-channel, enhancement mode MOS transistor is formed by the second and third regions 143 and 144, which are spaced apart and define the ends of another channel region 146. The second region 143 is referred to as the source region while the third region 144 is referred to as the drain region. It is understood that the MOS transistors may be made symmetrical; for example, in the first MOS transistor, the first region 142 may function as the drain region while the second region 143 may function as the source region.

The insulating dielectric layer 148 is formed over the surface 147 including the channel regions 145 and 146, and the first, second, and third regions 142, 143, and 144, with a portion of the surface of the third region 144 exposed.

The control gates 149 and 151, which function to apply potentials to portions of the insulating layer 148 overlying the respective channel regions 145 and 146, are formed over the insulating layer 148. The first control gate 149 is positioned over the first channel region 145, overlapping somewhat but insulated from the first and second regions 142 and 143, and covering the entire channel region 145 that extends from the first to the second regions 142 to 143. The second control gate 151 is positioned over the second channel region 146, overlapping somewhat but insulated from the second and third regions 145 and 146, and covering the entire channel region 146 that extends from the second to third regions 143 to 144. The control gates 149 and 151 are made from a deposited conductive metal such as aluminum.

A layer of opaque material 150 overlies a portion of the insulating layer 148 in the vicinity of the second and third regions 143 and 144 so that the sensitive regions are protected from exposure to light. A metalized ohmic electrical contact, such as an aluminum contact 151, is made to the exposed portion of the third region 144, and an ohmic contact 157 is provided for the substrate 141. The opaque material may be either nonmetallic (such as a photographic emulsion) or metallic (such as aluminum). Of course, if a metallic material is used, some means to insulate the metallic material from adjacent metal contacts must be employed.

Although these structure descriptions relate to particular embodiments, the principles involved are susceptible to numerous other embodiments which will be apparent to persons skilled in the art. For example, the invention is not limited to structures using only transistors or only diodes but includes various combinations of semiconductor devices, such as a diode with a transistor.

Figure 7:
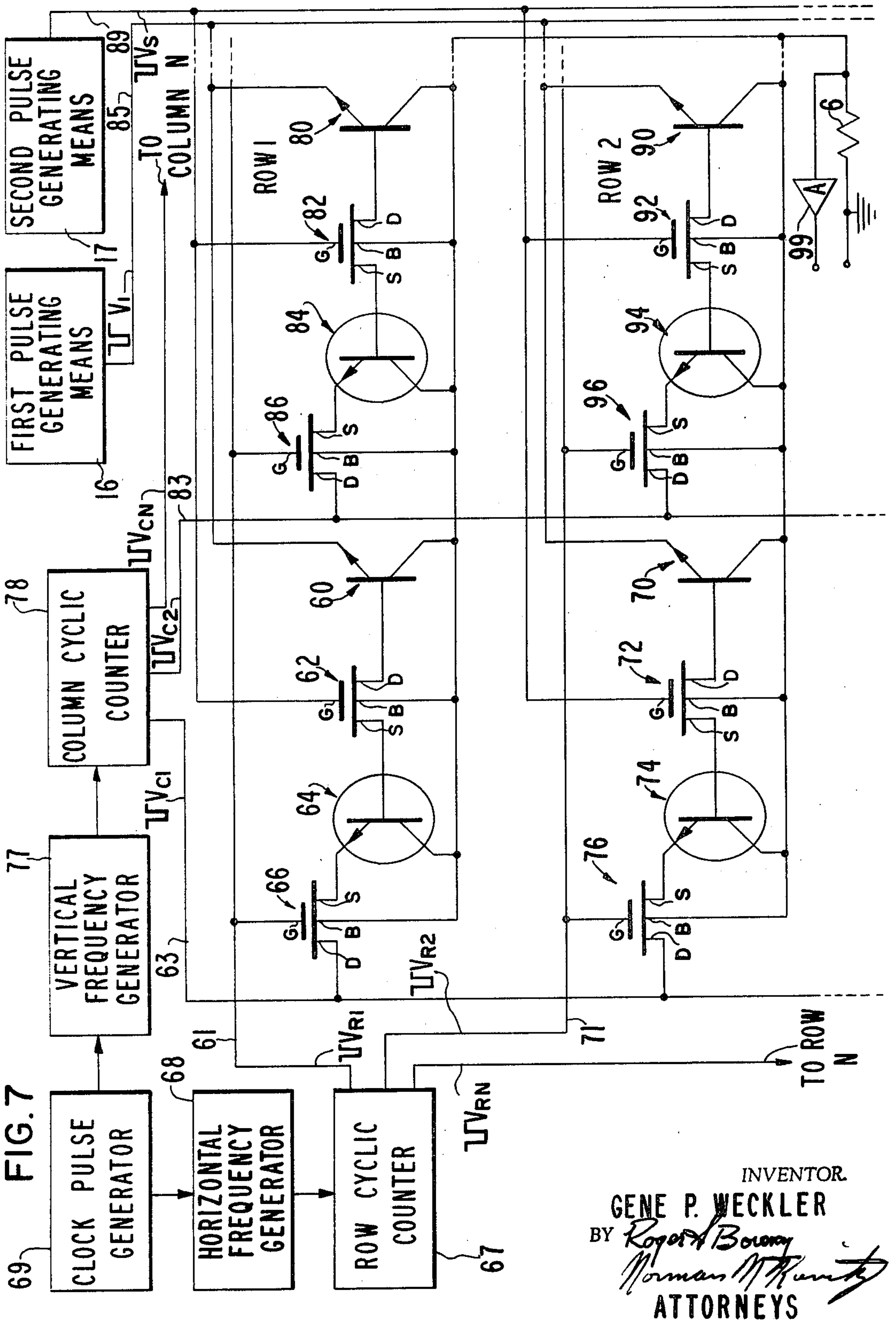
FIG. 7 is a schematic circuit diagram of the preferred embodiment for a two-dimensional array of the invented photodetector using transistors.

Referring now to FIG. 7, there is shown a schematic circuit diagram of a two-dimensional array of photodetectors with electronic shutter action of the type illustrated in FIG. 1 of this invention combined with array sampling techniques described in patent application Ser. No. 533,-635, filed Mar. 11, 1966, assigned to the same assignee as this invention. By way of illustration, and not to serve as a limitation upon the invention, there is also shown additional circuitry for selectively exciting the array at video frequencies, since an array, in accordance with this invention, may be considered as a solid-state equivalent to a vidicon tube. Further, a 2 by 2 array is shown. This also should not be construed as a limitation upon the invention, but only as exemplary since an array of the type described herein can be made with densities in excess of 200 photodetector devices per inch in each dimension.

In the array shown in FIG. 7, the photosensor means are shown as phototransistors, and in column 1 respectively are designated by reference numerals 60 and 70. In column 2 respectively they are designated by reference numerals 80 and 90. A storage means is associated with each photosensor and in FIG. 7 are shown as storage transistors. In the first column, the associated storage transistors are designated by numerals 64 and 74 respectively and in the second column by numerals 84 and 94 respectively. A dark oval is drawn around each storage transistor to indicate that its sensitive area is protected from exposure to light, and hence always in the dark. Associated with and coupled between each phototransistor and storage transistor is a gating element, shown in FIG. 7 as a first MOS transistor and designated respectively in column 1 by 62 and 72, and in column 2 by 82 and 92. Associated with each storage transistor is an output means, comprising a second MOS transistor designated respectively in column 1 as 66 and 76 and in column 2 as 86 and 96, and connected so that information stored in the storage transistors can be selectively read out.

A bus 85 connects all the emitters of all of the phototransistors 60, 70, 80, and 90 together and to the first pulse generating means 16, so that upon application of a negative voltage from the first pulse generating means 16, an initial charge is placed on the base-collector junction of each of the phototransistors. Another bus 89 connects all the gate electrodes of all of the first MOS transistors 62, 72, 82, and 92 together and to the second pulse generating means 17, so that upon application to this bus of a voltage which exceeds a predetermined threshold voltage for the MOS transistors, each of the first MOS transistors 62, 72, 82, and 92 is rendered operative so that a conductive path is formed between the base electrodes of the corresponding phototransistor and storage transistor. The drain electrode D of the first MOS transistor 62, 72, 82, and 92 is connected to the base of the associated phototransistor 60, 70, 80, and 90 respectively, and the source electrode S is connected to the base of the associated storage transistor 64, 74, 84, and 94 respectively, so that upon energization of the first MOS transistor, the charge on the base of the phototransistor is redistributed between the base of the phototransistor and the associated storage transistor via the conductive channel formed by the first MOS transistor.

A first row bus 61 connects the gate electrodes G of the second MOS transistors 66 and 86 together, so that upon the application to this row bus of a voltage which exceeds a predetermined threshold level, the second MOS transistors 66 and 86 are rendered operative.

A second row bus 71 connects together the gate electrodes G of the second MOS transistors 76 and 96. The application of a voltage to the second row bus 71 which exceeds a predetermined level renders operative the second MOS transistors 76 and 96.

A first column bus 63 is provided to which are connected the drain electrodes D of the respective second MOS transistors 66 and 76. A second column bus 83 is connected to the drain electrodes D of the second MOS transistors 86 and 96. The source electrode S of each of the second MOS transistors 66, 76, 86, and 96 is connected to the emitter of each of the storage transistors 64, 74, 84, and 94 respectively. The bulk electrode B of each of the second MOS transistors 66, 76, 86, and 96 is connected to the collector of each of the associated storage transistors 64, 74, 84, and 94 respectively and these are all connected to a common load resistance 6. Across the common load is connected the utilization apparatus 99. It should be appreciated that instead of a common load, if desired, a separate load may be used for each column which is scanned, or for each combination of first and second MOS transistors, storage transistor, and phototransistor which is addressed. The reason a common load is shown is to illustrate how the device may be utilized to generate a train of video signals analogous to the output of a television camera. This illustration, therefore, should not be construed as a limitation upon the use of the invention.

For the purpose of scanning the photodetector array shown, a clock pulse generator 69 applies pulses to a horizontal frequency generator 68, and to a vertical frequency generator 77. These respective horizontal and vertical frequency generators constitute dividers that divide down the clock pulse signal to a desired horizontal and vertical scanning frequency. The output of the horizontal frequency generator comprises pulse signals for scanning the rows, which are applied to a row cyclic counter 67. Each pulse of the counter is applied to excite the respective row buses 61 and 71. The output pulses from the vertical frequency generator 77 are applied to the column cyclic counter 78, which serves to distribute the vertical frequency pulse signals to the respective column buses 63 and 83.

Figure 8:
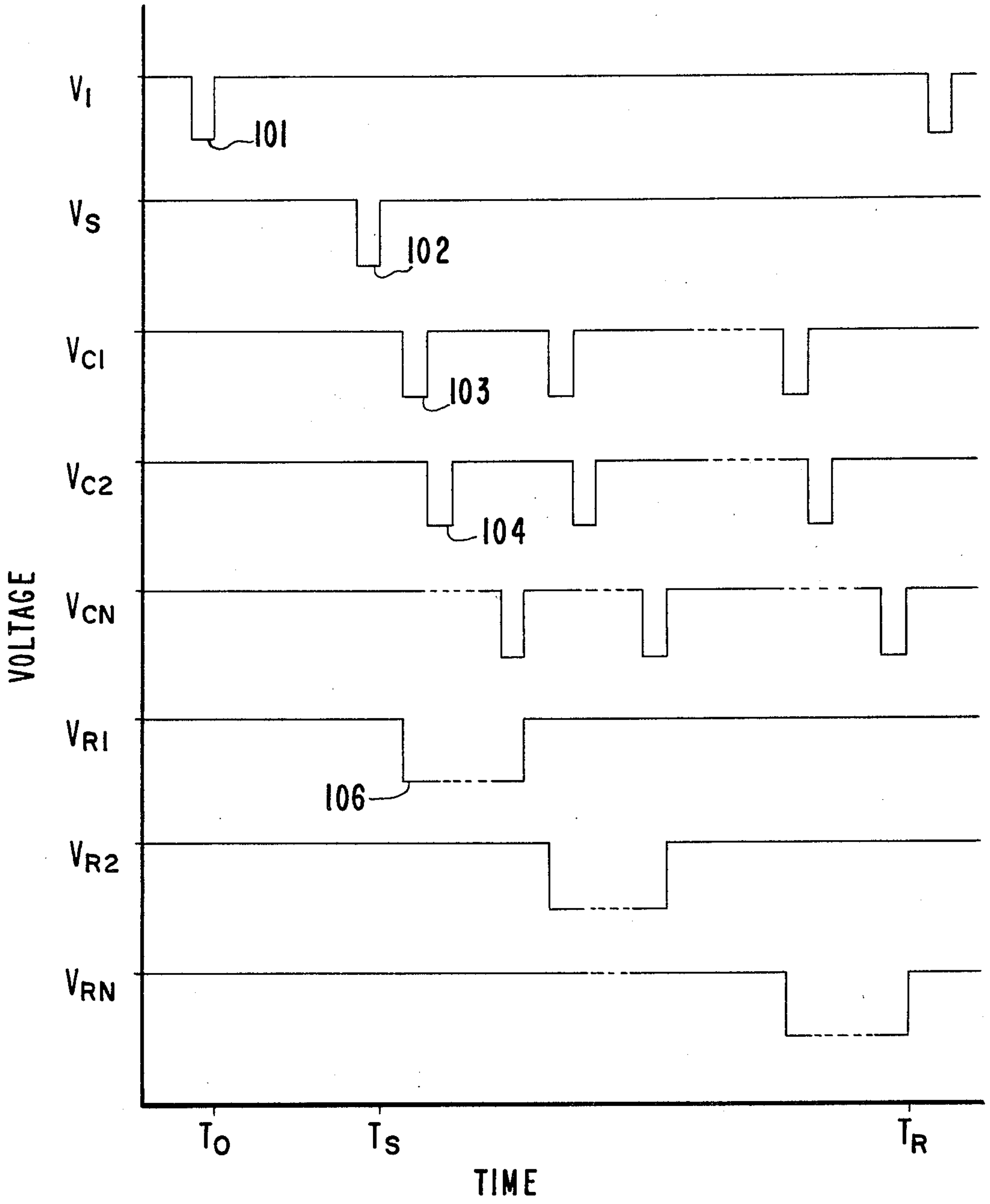
FIG. 8 is a timing diagram for the embodiment of FIG. 7.

Operation of the photodetector system will now be considered with reference to FIGS. 7 and 8. In order to initiate operation, a negative voltage 101 from the first pulse generating means 16 is applied via bus 85 to the emitters of each of the phototransistors 60, 70, 80, and 90 to place an initial charge on each respective base-collector junction. Once the junctions are charged, the voltage is removed and each phototransistor is now in the storage mode. Assume also that just prior to the application a negative voltage from the first pulse generator means 16, each base-collector junction of the storage transistors 64, 74, 84, and 94 is charged to a similar negative voltage. The manner in which this is done will be explained below.

Upon exposure at time $T_0$ of the array of photodetectors to impinging radiant energy for which it is desired to generate video signals, a photogenerated current is produced. The amplitude of the current in each device will vary with the intensity of the impinging radiant energy on that device. At a predetermined time, a negative voltage 102 from the second pulse generating means 17 is applied via bus 89 to each gate electrode G of the associated MOS transistors 62, 72, 82, and 92 to render them operative, and thus form a connection between the base of each phototransistor and the associated storage transistor. The charge generated by the phototransistor is then redistributed between the collector-base junction of the phototransistor and the collector-base junction of the associated storage transistor. At time $T_s$, the negative voltage 102 from the second pulse generating means 17 is then removed from each gate electrode G of the MOS transistors 64, 74, 84, and 94, and each associated storage transistor is isolated again from the respective phototransistor. As previously mentioned, each storage transistor is protected from exposure to light, so that when the storage transistor is isolated from the phototransistor, it will be insensitive to any variation in the impinging radiant energy upon the phototransistor. The charge representing the light image is now stored in the collector-base junction of the storage transistor for readout at a later time.

Upon the application of a scanning signal to both the row and column cyclic counters energizing the first row bus 61 and the first column bus 63, a negative voltage pulse 103 is applied to the drain electrode D of the second MOS transistor 66 from the first column bus 63, and another negative voltage 106 is applied to the gate electrode G from the first row bus 61. A conductive path is formed between the source and drain electrodes, so that current can flow from the column bus through the second MOS transistor 66, through the storage transistor 64, and down through the common load resistor 6. The amplitude of this current which is detected by the means 99, varies with the charge on the collector-base junction of the storage transistor 64, which was redistributed from the collector-base junction of the phototransistor 60, and which of course, represents the intensity of the radiant energy that impinged upon the phototransistor. The current passing through transistor 64 also serves to recharge the collector-base junction of transistor 64 to its initial value so that it is again in a condition to receive information from the phototransistor 60. While the negative voltage 106 from the row cyclic counter 67 maintains the first row bus 61 energized, the column cyclic counter 78 applies a negative voltage 104 to the second column bus 83 and to the drain electrode D of the second MOS transistor 86, whereby current is caused to flow through the common load resistor 6. The amplitude of the current as determined by the charge stored in the storage transistor 84 and represents the intensity of radiant energy impinging upon the phototransistor 80 instead of the phototransistor 60. The foregoing briefly indicates the scanning action of the photodetector; that is, each one of the columns is energized in turn while the energization is maintained for each row. A sequence of voltages is generated across the common load resistor 6, which represents the impinging radiant energy to which the phototransistors are exposed. The utilization apparatus 99 may be either a display device or any other suitable device for processing the video signal waveform which is generated by the circuitry shown in FIG. 7. It should be noted that while sequential selection of rows and columns is described, selection does not necessarily have to be sequential. Selection may be done in any desired sequence. This invention therefore presents a simple arrangement for embodying the image that is being presented to the array.

There has accordingly been described and shown herein a novel, useful, and unique storage mode photodetector with electronic shutter operation, all of which can be accomplished with a minimum of complexity and in a manner consistent with present processing technology. The described photodetector device may be fabricated in the form of an integrated circuit and in the form of integrated circuit arrays.

Although this invention has been disclosed and illustrated with reference to particular applications and embodiments, the principles involved are susceptible of numerous other applications and embodiments which will be apparent to persons skilled in the art. It is possible to use a number of different combinations of solid-state elements having at least one P-N junction for the photosensor or storage element. For example, the transistor 10 shown in FIG. 1 and the diode 25 shown in FIG. 3 can be used in the same circuit, one as the photosensor element and the other as the storage element with its sensitive area protected from exposure to light. The invention is, therefore, to be limited only as indicated by the scope of the appended claims.

What is claimed is:

1. A storage-mode photodetector device with electronic shutter action comprising:
   - a photosensor means having at least one P-N junction therein for producing an electronic signal representing impinging radiant energy thereupon;
   - a storage means having at least one P-N junction therein for storing said electronic signal;
   - a coupling means between said photosensor means and said storage means for transferring said electronic signal from said photosensor means to said storage means at selected intervals; and
   - a means for reading said electronic signal in said storage means at selected intervals.

2. The photodetector device recited in claim 1 wherein said photosensor means and said storage means are semiconductor elements operating in the storage mode, with said storage means having its photosensitive area protected from exposure to impinging radiant energy; said coupling means comprises a gating element connected between said photosensor means and said storage means, and means connected to said gating element for rendering said gating element operative at selective intervals; and means coupled to said photosensor for charging, at selected intervals, a P-N junction therein to a predetermined level.

3. The photodetector device recited in claim 2 wherein said photosensor means and said storage means are first and second transistors respectively; said charging means comprises a first pulse generating means for charging the base-collector junction of said first transistor; said gating element is connected between the bases of said first and second transistors; said means for rendering said gating element operative is a second pulse generating means; and said means for reading is coupled to said second transistor for reading the charge stored in the base-collector P-N junction therein.

4. The photodetector device recited in claim 2 wherein said first and second transistors comprise double diffused planar structures having a low leakage current; and said gating element comprises an MOS transistor having the source and drain electrodes connected between the base of said first transistor and the base of said second transistor, and the gate electrode connected to said second pulse generating means.

5. The photodetector device recited in claim 2 wherein said photosensor means and said storage means are first and second diodes respectively, with one electrode of said first diode connected to a common junction with a like electrode of said second diode; and said means for reading is coupled to said second diode for reading the charge stored in the anode-cathode junction therein at selected intervals.

6. The photodetector device recited in claim 5 wherein said first and second diodes comprise planar structures having a low leakage current; and said coupling means comprises a first MOS transistor having the source and drain electrodes connected between the unconnected electrodes of said first and second diodes, and the gate electrode connected to a first pulse generating means.

7. A storage mode photodetector device with electronic shutter action comprising:

a first and a second semiconductor planar diode operating in the storage mode, with one electrode of said first diode connected to a common junction with a like electrode of said second diode, said first diode responsive to impinging radiant energy, said second diode having its radiant energy sensitive area protected from exposure to light;

a first MOS transistor having the source and drain electrodes connected between the unconnected electrodes of said first and second diodes;

a first pulse generating means connected to the gate electrode of said first MOS transistor to render said MOS transistor operative at selective intervals;

a series circuit consisting of a load resistance and a voltage source, with one terminal of said circuit connected to said common junction between said first and second diode;

a second MOS transistor having its source and drain electrode connected between said second diode and the other terminal of said series circuit; and a second pulse generating means connected to the gate electrode of said second MOS transistor to render said MOS transistor operative at selected intervals.

8. A storage mode photodetector system with electronic shutter action comprising:

a first array of a plurality of photosensor means having at least one P-N junction, said photosensor means arranged in rows and columns;

a second array of a plurality of storage means having at least one P-N junction, said storage means arranged in a corresponding number of rows and columns, there being a storage means for each photosensor means;

a third array of a plurality of coupling means, said coupling means arranged in a corresponding number of rows and columns, there being a coupling means connected between each photosensor means and corresponding storage means for transferring information from said photosensor means to said storage means at selected intervals;

a means coupled to said storage means for selectively reading information stored in said storage means.

9. The system recited in claim 8 wherein said first array of a plurality of photosensor means comprises a number of first transistors operating in the storage mode; said first transistors are coupled to a first pulse generating means for charging the base-collector junctions therein at selected intervals; said plurality of storage means in said second array comprises a number of second transistors operating in the storage mode with the photosensitive area of each protected from exposure to light; said plurality of coupling means in said third array comprises a number of first gating elements, there being a first gating element connected between each of said first and second transistors, a second pulse generating means connected to said first gating elements for rendering said first gating elements operative at selective intervals; and said means for reading is coupled to said second transistors for selectively reading the charge stored in the base-collector P-N junctions therein.

10. The photodetector system recited in claim 9 wherein said first and second transistors comprise double diffused planar structures having low leakage current; and said first gating element comprises a first MOS transistor with the source and drain electrodes connected between the base of a corresponding first transistor and the base of a corresponding second transistor, and the gate electrode connected to said second pulse generating means.

11. The photodetector system recited in claim 9 wherein said means for reading comprises a fourth array of a plurality of second gating elements arranged in rows and columns, there being a second gating element corresponding to and coupled to each of said second transistors; a means for selectively applying energizing potentials to a predetermined row of said second gating elements to render said gating elements operative; another means for selectively applying energizing potentials to a predetermined column so that when said second gating elements in a predetermined row are rendered operative, the gating element at the intersection of the predetermined row and column allows current to flow between the emitter and collector of the corresponding second transistor, and the charge stored on the collector-base junction therein to be read.

12. The photodetector system recited in claim 11 wherein each second gating element in said fourth array is an MOS transistor having the gate electrode connected to a corresponding row bus, and the source and drain electrodes connected between a corresponding column bus and the emitter of a corresponding second transistor.

13. A storage mode photodetector structure with electronic shutter action comprising:

a monocrystalline semiconductor body of a first conductivity type having having a surface;

a first and a second region of monocrystalline semiconductor of an opposite conductivity type disposed within said body, each region forming a separate P-N junction with said body, said junction having an edge at the surface of said body, said first and second regions spaced apart to define the ends of a channel region, whereby upon application of a suitable electric field a current may flow from one region to the other region via said channel;

a separated region of said first conductivity type disposed within each of said first and second regions and extended inwardly from said surface of said semiconductor body, said separated region forming a separated P-N junction with said first and second regions, said separated junction having its edge at the surface of said body;

an electrical insulating layer overlying said body, said first and second regions, said separated regions, and said channel region, and exposing a portion of said separated regions;

a means for making electrical contact to said exposed portion of said separated regions;

a gate means for applying a potential to at least a portion of said insulating layer overlying said channel;

an opaque material covering said electrical insulating layer overlying said second region, so that the photosensitive area of said second region is protected from exposure to light.

14. The photodetector structure recited in claim 13 wherein said semiconductor body and said first and second regions are monocrystalline silicon, said insulating layer is a silicon oxide, and said gate means is a metal layer.

15. The photodetector structure recited in claim 13 wherein said opaque material covering said sensitive area of said second region is aluminum.

16. A storage mode photodetector structure with electronic shutter action comprising:

a monocrystalline semiconductor body of a conductivity type having a surface;

a first region, a second region, and a third region of monocrystalline semiconductor having an opposite conductivity type within said body, each region forming a separate P-N junction with said body, said junction having an edge at the surface of said body, said first and second regions spaced apart to define the ends of a first channel region, said second and third regions spaced apart to define the ends of a second channel region, whereby upon application of a suitable electric field a current may flow from one region to the other region via said channels;

an electrical insulating layer overlying said body, said first and second channels, and said first, second, and third regions, and exposing a portion of said third region;

a means for making electrical contact to said exposed portion of said third region;

a first gate means for applying a potential to at least a portion of said insulating layer overlying said first channel;

a second gate means for applying a potential to at least a portion of said insulation layer overlying said second channel;

an opaque material covering said electrical insulating layer overlying said second and third regions, so that the photosensitive areas of said second and third regions are protected from exposure to light.

17. The photodetector structure recited in claim 14 wherein said body and said first, second, and third regions are monocrystalline silicon; said insulating layer is a silicon oxide; and said first and second gate means comprise metal layers.

18. The photodetector structure recited in claim 15 wherein said opaque material covering said photosensitive areas of said second and third regions is aluminum.

No references cited.

RALPH G. NILSON, *Primary Examiner.*

M. ABRAMSON, *Examiner.*